UNITED STATES PATENT OFFICE.

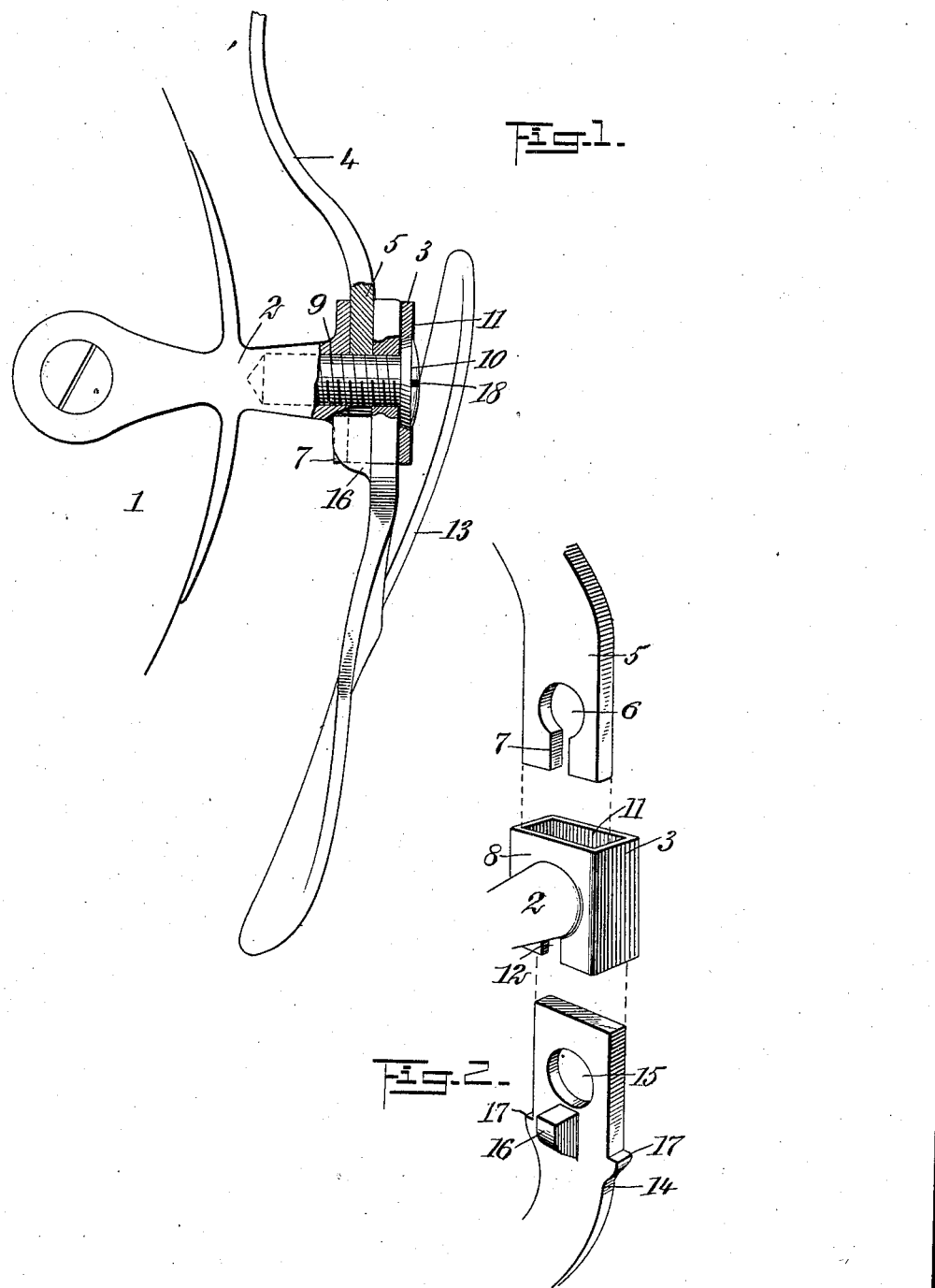

DALLTOR WALDEMAR KOLLE, OF PORTLAND, OREGON.

FASTENER FOR EYEGLASSES.

No. 833,531.　　　　Specification of Letters Patent.　　　　Patented Oct. 16, 1906.

Application filed January 11, 1906. Serial No. 295,564.

*To all whom it may concern:*

Be it known that I, DALLTOR WALDEMAR KOLLE, a citizen of the United States, and a resident of Portland, in the county of Multnomah and State of Oregon, have invented a new and Improved Fastener for Eyeglasses, of which the following is a full, clear, and exact description.

This invention relates to fasteners for eyeglasses or spectacles.

It is especially useful in connection with the construction of eyeglasses for making a simple connection between the lens, the bow or spring, and the nose-guard.

The invention consists in the construction and combination of parts to be more fully described hereinafter and particularly set forth in the claims.

Reference is to be had to the accompanying drawings, forming a part of this specification, in which similar characters of reference indicate corresponding parts in both views.

Figure 1 is a front elevation showing the fastener, certain parts being broken away and represented in section. In this view the nose-guard is shown complete, while the bow or spring and the lens are represented as broken away. Fig. 2 is a perspective representing the parts which form the fastening in the act of being assembled.

Referring more particularly to the parts, 1 represents the inner portion of the lens, which is attached in any suitable manner, such as that shown, to a post or stud 2. This post 2 is substantially circular in cross-section and enlarges toward its outer extremity, where it is formed into an angular socket 3. This socket is preferably rectangular in form and is open above and below. The bow or spring 4 of the eyeglasses is formed with the usual shank or straight extension 5 near the lens 1, and near the lower extremity of this extension, as shown most clearly in Fig. 2, a round opening 6 is made, said opening being connected with the lower extremity of the extension 5 by means of a slot 7, as illustrated. This extension 5 is adapted to be shoved down into the upper extremity of the socket in the manner indicated in Fig. 2, so that its outer face rests against the outer face or wall 8 of the socket 3. In this way the opening 6 may be brought into alinement with a threaded bore 9, which is formed in the stud 2 to receive a clamping-screw 10, and the outer wall 11 of the socket 3 is formed with an enlarged opening to receive the head of this screw, as indicated most clearly in Fig. 1. In the lower edge of the wall 8 of the socket 3 I provide a slot 12, which when the extension 5 is in position comes substantially into alinement with the slot 7 of the extension.

The nose-guard 13 is formed with an upwardly-projecting flat extension or arm 14, which is formed with an opening 15, as shown. This arm 14 is adapted to be inserted in the socket 3 from below, so that the opening 15 may be brought into alinement with the opening 6 and the bore 9. Upon the outer face of the arm 14, just below the opening 15, I provide an inwardly-projecting lug 16, and this lug is of such a width as to fit neatly into the alining slots 7 and 12. When the parts are brought together in the manner illustrated and securely fastened by means of the screw 10, they will evidently not only be pressed together firmly, but the bow 4, as well as the guard 13, will be locked against rotation upon the axis of the screw by reason of the lug 16. In this connection it should be understood that the lug 16 is of sufficient length to extend completely through the slot 7, its outer edge being received in the slot 12.

In order to increase the rigidity of the joint as respects the guard 13, the side edges of the arm 14 thereof are provided with laterally-projecting nibs or shoulders 17, which engage the lower edge of the socket 3 on opposite sides. These nibs or shoulders 17 also operate as stops, so as to facilitate the alinement of the opening 15 with the bore 9 when assembling the parts. The head of the screw 10 is formed with a slot 18 to receive the tip of a screw-driver, as will be readily understood.

Having thus described my invention, I claim as new and desire to secure by Letters Patent—

1. In a fastener of the class described in combination, a stud adapted to be attached to a lens and having a transverse socket formed therein, a bow having a shank passing downwardly into said socket, a guard having an arm passing upwardly into said socket, said arm having a projection upon the face thereof, said socket and said shank having slots receiving said projection, said shank and said arm having alining openings, and a screw passing through said openings and set in said stud.

2. In a fastener of the class described, in combination, a stud adapted to be attached to a lens and having a socket formed transversely therein, a bow having a shank passing downwardly into said socket, a guard having an arm passing upwardly into said socket, a projection formed on the face of said arm, said shank having an opening with a slot leading from the edge thereof, said arm having an opening alining with said first opening, and a screw passing through said openings and seating in said stud, said slot receiving said projection whereby said shank and said arm interlock with said socket.

In testimony whereof I have signed my name to this specification in the presence of two subscribing witnesses.

DALLTOR WALDEMAR KOLLE.

Witnesses:
    W. A. CLELAND,
    EDW. T. PETERSON.